(12) United States Patent
Itami

(10) Patent No.: US 8,724,169 B2
(45) Date of Patent: May 13, 2014

(54) IMAGE PROCESSING APPARATUS FOR PRINTING WITH A SPOT COLOR RECORDING MATERIAL AND THREE-DIMENSIONALLY PREVIEWING AN OUTPUT IMAGE IN A VIRTUAL SPACE PRIOR TO PRINTING

(75) Inventor: Tsuyoshi Itami, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 202 days.

(21) Appl. No.: 13/215,927

(22) Filed: Aug. 23, 2011

(65) Prior Publication Data
US 2012/0051777 A1 Mar. 1, 2012

(30) Foreign Application Priority Data

Aug. 30, 2010 (JP) ................. 2010-192400

(51) Int. Cl.
*H04N 1/60* (2006.01)
(52) U.S. Cl.
USPC ............................. 358/1.9; 399/81
(58) Field of Classification Search
CPC .................................. G03G 15/5016
USPC .................. 358/1.18, 1.9; 399/40, 81
See application file for complete search history.

(56) References Cited

U.S. PATENT DOCUMENTS

| 2010/0027040 A1 | 2/2010 | Kuroda |
| 2010/0195126 A1* | 8/2010 | Shiozawa ........................ 358/1.9 |
| 2011/0075200 A1* | 3/2011 | Goldwater et al. .......... 358/1.18 |

FOREIGN PATENT DOCUMENTS

| CN | 1905614 A | 1/2007 |
| CN | 101566813 A | 10/2009 |
| JP | 2006-251722 A | 9/2006 |
| JP | 2008-145784 A | 6/2008 |
| JP | 2010-175968 A | 8/2010 |

\* cited by examiner

*Primary Examiner* — Benny Q Tieu
*Assistant Examiner* — Juan M Guillermety
(74) *Attorney, Agent, or Firm* — Canon USA Inc. IP Division

(57) ABSTRACT

An image processing apparatus includes a designation unit configured to designate a region for printing on a virtual printed product with a transparent recording material, an acquisition unit configured to acquire a reflectance in the region for printing with the transparent recording material on the region designated by the designation unit, a setting unit configured to set a percentage of a region in which the reflectance acquired by the acquisition unit is larger than a threshold to the virtual printed product, and a display unit configured to display a preview of the virtual printed product on which the region with the reflectance larger than the threshold exists at the percentage set by the setting unit.

19 Claims, 25 Drawing Sheets

FIG.9

| PAPER TYPE (901) | ANGLE OF INCIDENCE (902) | AMOUNT OF APPLICATION OF CYAN TONER (903) | AMOUNT OF APPLICATION OF MAGENTA TONER (904) | AMOUNT OF APPLICATION OF YELLOW TONER (905) | AMOUNT OF APPLICATION OF BLACK TONER (906) | AMOUNT OF APPLICATION OF TRANSPARENT TONER (907) | PARAMETERS (a,b) OF TARGET MODEL (908) |
|---|---|---|---|---|---|---|---|
| GLOSS PAPER | 45° | 10% | 10% | 10% | 10% | 100% | a = 1.0  b = 1.0 |
| GLOSS PAPER | 45° | 20% | 20% | 20% | 20% | 100% | a = 1.0  b = 1.2 |
| GLOSS PAPER | 45° | 30% | 30% | 30% | 30% | 100% | a = 2.0  b = 1.4 |
| GLOSS PAPER | 45° | 40% | 40% | 40% | 40% | 100% | a = 2.0  b = 1.6 |
| ... | ... | ... | ... | ... | ... | ... | ... |

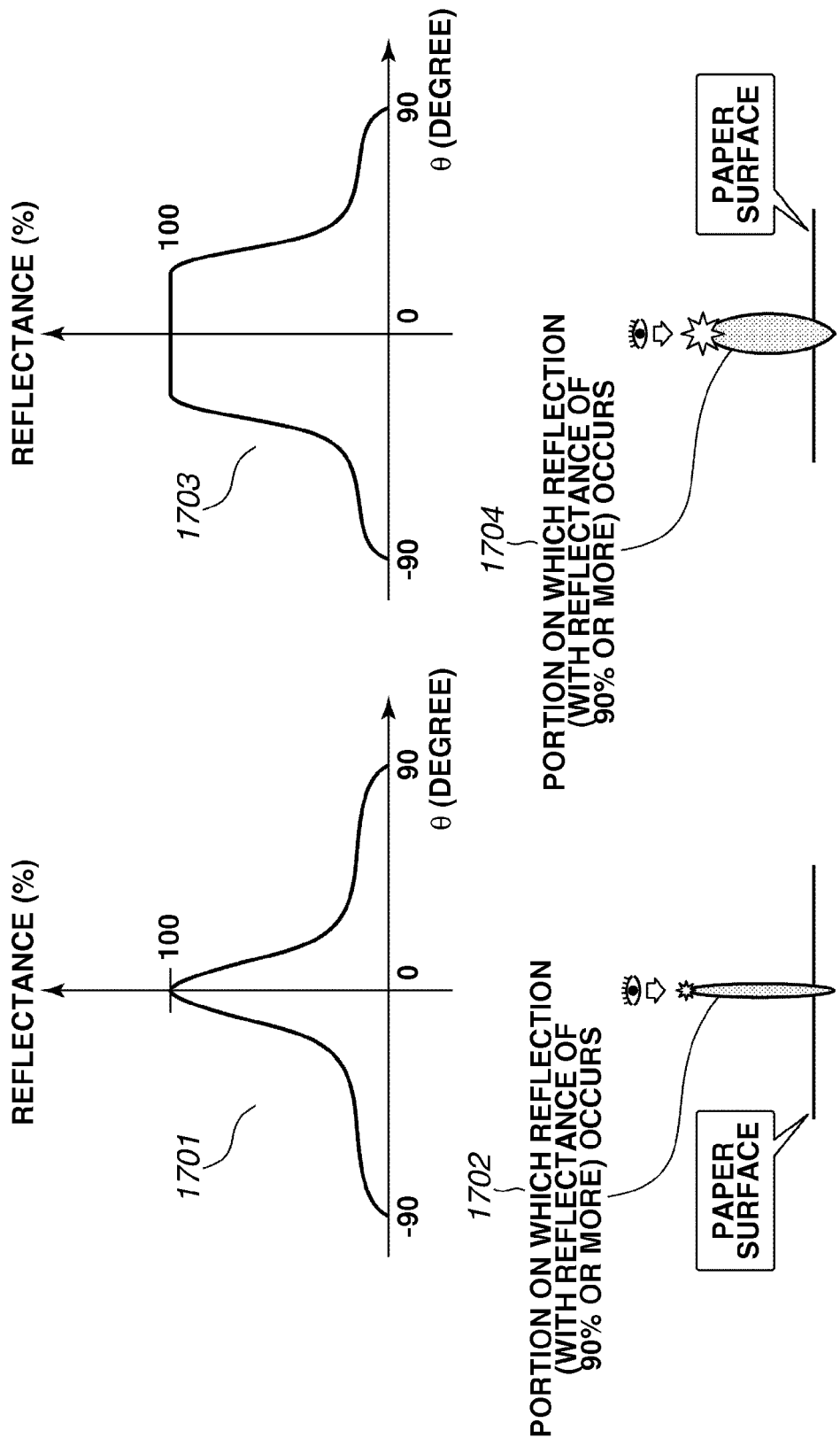

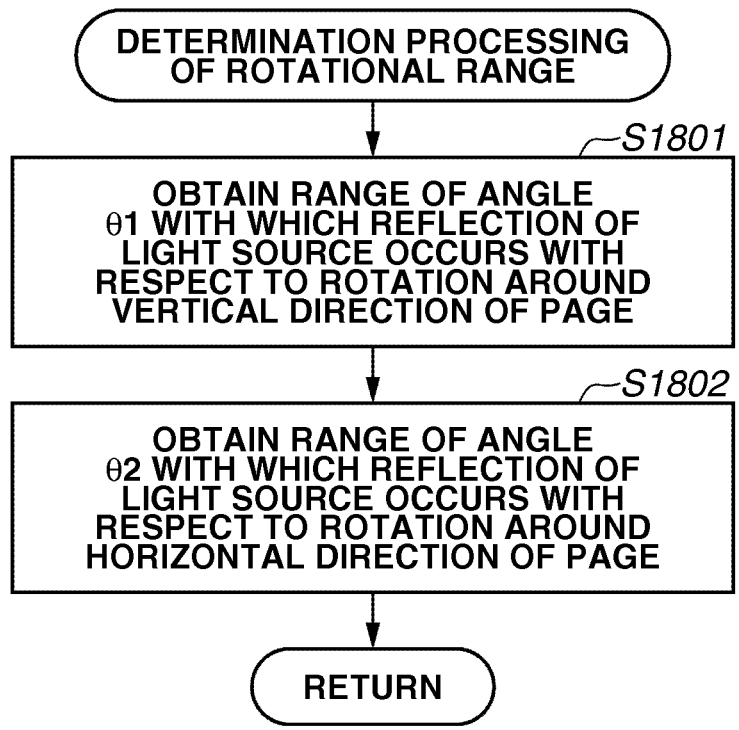

IMAGE PROCESSING APPARATUS FOR PRINTING WITH A SPOT COLOR RECORDING MATERIAL AND THREE-DIMENSIONALLY PREVIEWING AN OUTPUT IMAGE IN A VIRTUAL SPACE PRIOR TO PRINTING

BACKGROUND OF THE INVENTION

1. Field of the Invention

The present invention relates to an image processing apparatus. In particular, the present invention relates to an image processing apparatus that is capable of executing printing with a spot color recording material and is capable of, prior to executing the printing, three-dimensionally previewing an output image in a virtual space.

2. Description of the Related Art

A conventional image processing apparatus can capture drawing data supplied from a host computer and forms an image based on the drawing data. The image processing apparatus uses an electrophotographic method, for example. In such an electrophotographic printing apparatus, a charging device chares a photosensitive drum to form an electrostatic latent image on the photosensitive drum with write light corresponding to image data. A developing device causes toner to adhere to the electrostatic latent image to develop the electrostatic latent image with the toner, thereby forming a visible image. Then, the toner image is transferred from the photosensitive drum to a sheet of paper and is fixed to the sheet with heat and pressure.

In the electrophotographic image processing apparatus, toners of cyan, magenta, yellow, and black (CMYK) are used as basic print colors called process colors. In addition, a toner of transparent color as a spot color recording material is applied to a part or the whole of a print image (see, e.g., Japanese Patent Application Laid-Open No. 2006-251722).

The spot color recording material includes, for example, green, orange, gold, silver, and transparent toners other than the CMYK toners.

In particular, the transparent toner is a transparent recording material with a characteristic for adding an image with transparency. With the transparent toner, specific textures such as gloss, luster, and mat can be expressed unlike printing using only the color toners.

For example, Japanese Patent Application Laid-Open No. 2008-145784 discusses an apparatus that provides in advance a preview of a printed product prior to printing using a spot color recording material. In the apparatus discussed in Japanese Patent Application Laid-Open No. 2008-145784, when print data is printed with a spot color recording material, a portion to be printed out with the spot color recording material is detected in advance, and the detected portion is displayed as a preview with a specific color or pattern.

Further, in the apparatus discussed in Japanese Patent Application Laid-Open No. 2008-145784, the preview display of the spot color recording material can be switched among the settings of off/auto/designated color. In the off-setting, the preview is not displayed. In the auto setting, such a function is provided to detect a color of a portion to which the spot color recording material is applied and to display the preview of a color different from the color of that portion as a spot-color portion. In the designated-color setting, a position to which the spot color recording material is applied is displayed with a color designated by a user.

In the case of printing using a spot color recording material, if an effect obtained by using the spot color recording material is constant (solid coloring of green or orange as a spot color), the preview for expressing the portion with the spot color recording material applied can be performed according to a method discussed in Japanese Patent Application Laid-Open No. 2008-145784. More specifically, if the portion with the spot color recording material applied is displayed with a specific color or pattern as in portions 101, 102, and 103 illustrated in FIG. 1, a user can totally imagine the finishing of printing. When printing is performed with a transparent toner, which has recently been released in the market, the light reflectance on the surface of a printed product can be changed. With such a characteristic of the transparent toner, a watermark pattern can be applied to the printed product, or a graphic effect with the texture can be produced.

In a preview for checking the finishing of a printed product by the user prior to printing with the spot color recording material whose light reflectance changes, the following preview method can be used. More specifically, in a window 401 illustrated in FIG. 4, a virtual light source and a virtual printed product are arranged in a virtual three-dimensional space. The user can freely rotate the virtual printed product via a mouse as illustrated in windows 501, 502, and 503 in FIG. 5, so that there can be considered a preview method for obtaining the texture with light reflection (referred to as "reflection of a light source") with respect to the virtual printed product set in the virtual space.

The preview method for the virtual printed product appearing in the virtual space with light received from the virtual light source is referred to as a "three-dimensional preview" below.

However, in providing the three-dimensional preview, a method for adjusting the degree of occurrence of the reflection of a light source by the user may be troublesome to easily check the texture of a region to be printed with the spot color recording material on the virtual printed product. Thus, when the user rotates the virtual printed product in the preview via the mouse, it is difficult for the user to preview the virtual printed product while optimally adjusting the reflection of a light source.

Therefore, as illustrated in a window 601 in FIG. 6, the amount of reflection of the virtual light source to the virtual printed product may be excessively large depending on the setting of the virtual light source. Thus, the preview may make it difficult for the user to check a portion to be previewed. It is hence difficult for the user to recognize how the reflection of a light source is adjusted to accomplish the easiest preview display.

SUMMARY OF THE INVENTION

The present invention is directed to providing a preview for checking the texture of a spot color recording material.

According to an aspect of the present invention, an image processing apparatus includes a designation unit configured to designate a region for printing on a virtual printed product with a transparent recording material, an acquisition unit configured to acquire a reflectance in the region for printing with the transparent recording material on the region designated by the designation unit, a setting unit configured to set a percentage of a region in which the reflectance acquired by the acquisition unit is larger than a threshold to the virtual printed product, and a display unit configured to display a preview of the virtual printed product on which the region with the reflectance larger than the threshold exists at the percentage set by the setting unit.

According to an exemplary embodiment of the present invention, the user can check the texture of a spot color recording material at a percentage of pixels on which the reflection of a light source occurs according to the user's preference. Further, the user can rotate the virtual printed product within the best range when a user automatically previews the virtual printed product. Thus, such a preview function is provided to automatically check the texture of the virtual printed product to the region for printing with the spot color recording material according to the optimum percentage of pixels on which the reflection of a light source occurs.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 9 illustrates an example of a look-up table (LUT).

FIG. 17 schematically illustrates the reflection of a light source.

FIGS. 18A to 18C are respectively a flowchart of a processing sequence of determination processing of a rotational range by the image processing apparatus and complementary diagrams thereof according to the exemplary embodiment of the present invention.

DESCRIPTION OF THE EMBODIMENTS

Various exemplary embodiments, features, and aspects of the invention will be described in detail below with reference to the drawings.

According to an exemplary embodiment of the present invention, a transparent toner is used as a spot color recording material. However, the present invention is not limited to this and any recording material, e.g., a light toner or clear ink may be used to change the light reflectance depending on a background state.

The transparent toner has such a characteristic that the light reflectance varies depending on the state of a background to which the transparent toner is applied. The background is a state of the surface of a printing medium (output paper) before the transparent toner is applied thereto. The characteristic about a change of the reflectance depending on the background state is described as an example below. When the transparent toner is used, a print effect that can be obtained with the transparent toner is not always constant in a portion with the transparent toner applied, unlike the solid coloring of green or orange as a spot color.

Figure 1:
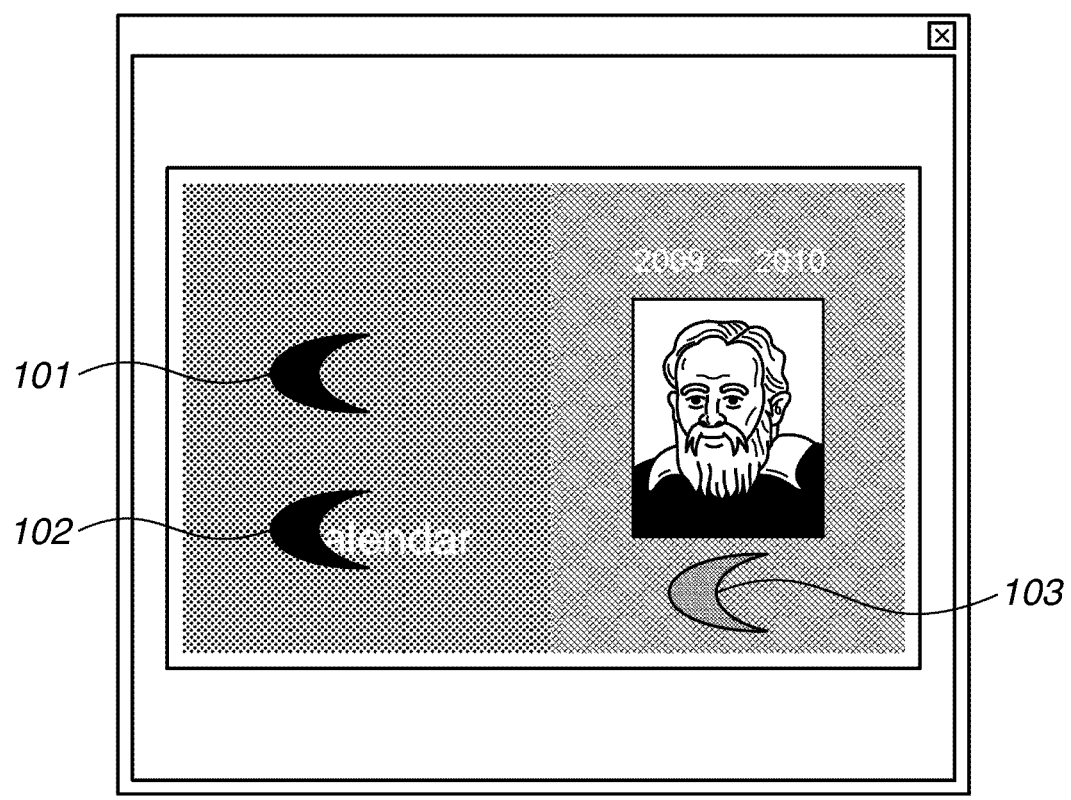
FIG. 1 illustrates an example of a preview on which a spot color recording material is applied.
Figure 2:
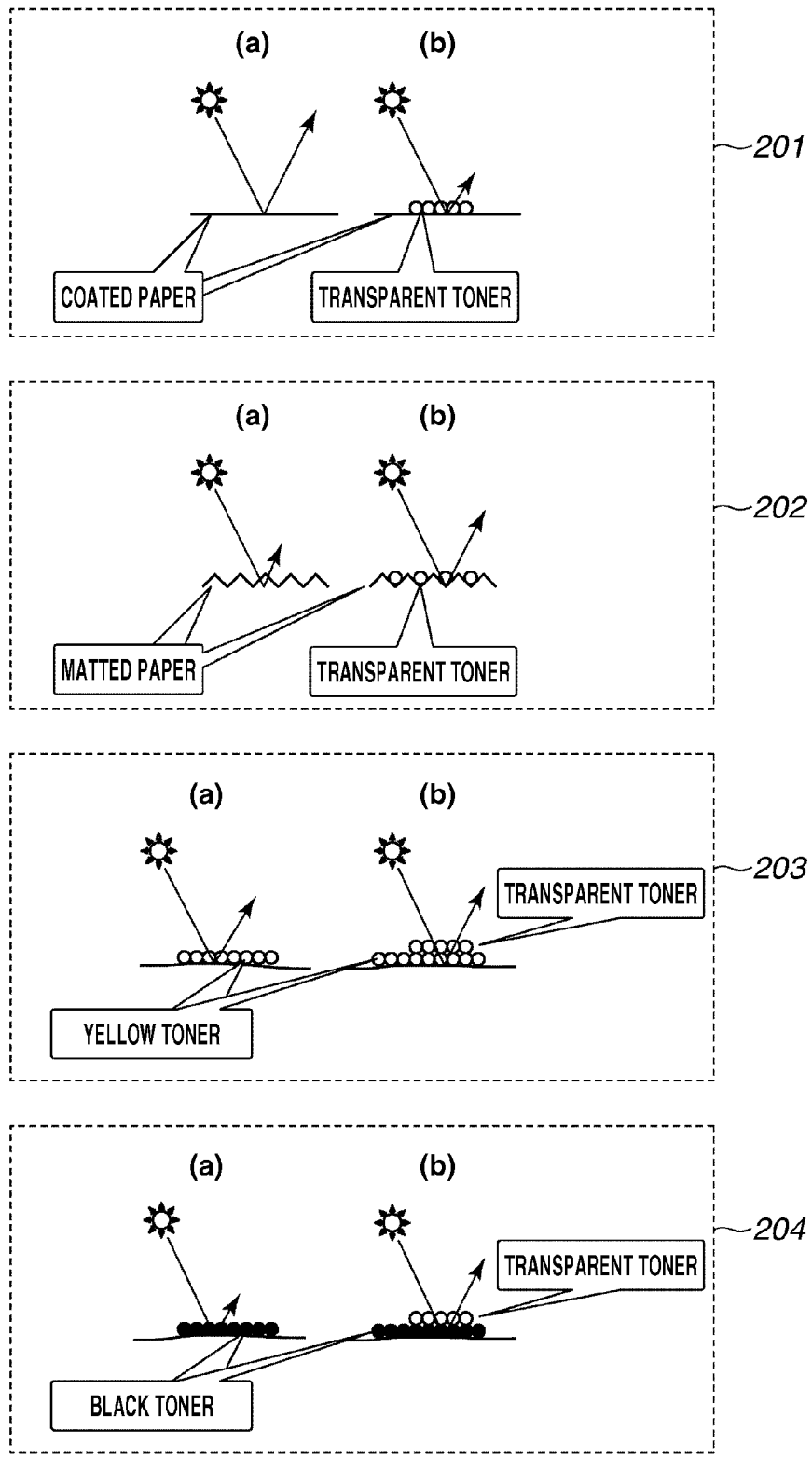
FIG. 2 illustrates examples of light reflectance.

Portions 201 to 204 in FIG. 2 illustrate examples of the light reflectance, which varies depending on the background state with regard to respective characteristics of the background, when printing is performed with the transparent toner. The portion 201 in FIG. 2 illustrates the light reflectance on a printed product when printing is performed with the transparent toner on coated paper with high smoothness.

On the printed product, the smoothness of a portion (a) without the transparent toner used in printing remains high, and the reflectance thereof is, therefore, high. However, at a portion (b) with the transparent toner used in printing on the same printed product, the smoothness of that portion decreases due to the unevenness given by the transparent toner, so that the light reflectance thereof is reduced.

On the other hand, the portion 202 in FIG. 2 illustrates the light reflectance on a printed product with the transparent toner used in printing on matted paper with low smoothness.

On the printed product, the smoothness is low at a portion (a) without the transparent toner used in printing, and the reflectance is, therefore, low. However, at a portion (b) with the transparent toner used in printing on the same printed product, the unevenness of the matted paper is smoothed by the transparent toner, and the reflectance thereof, therefore, becomes high.

The portion 203 in FIG. 2 illustrates the light reflectance on a printed product when printing is performed with a toner with pigment characteristics as being relatively transparent, e.g., yellow toner on the print paper. A portion (a) exhibits the light reflection in a state of printing without using the transparent toner on a printed portion using the toner with the similar characteristics to those of the transparent toner. A portion (b) exhibits the light reflection in printing using the transparent toner on a portion printed with the toner with the similar pigment characteristics to those of the transparent toner. Between the portions (a) and (b), there is no difference in reflectance.

The toner with the similar pigment characteristics to those of the transparent toner is, e.g., a yellow toner with light pigment.

In comparison between white (light pigment) toner and black (dark pigment) toner, the amount of light reflection of the black toner is generally lower than that of the white toner, because the black toner absorbs an amount of light larger than the white toner. On the other hand, the white toner has a large amount of light reflection because the white toner almost does not absorb light.

Similar to the white toner, the yellow toner has a light color, and the amount of light absorption thereof is thus low, and the reflection thereof is high. The transparent toner also has a light color and has the same characteristics as those of the yellow toner.

Therefore, even if the transparent toner with high reflectance is applied on the yellow toner having high reflectance, there cannot be the difference in light reflectance between the times before/after applying the transparent toner.

Unlike the portion 203 in FIG. 2, the portion 204 exhibits the light reflectance in printing using the transparent toner on a portion subjected to printing with a toner, such as a black toner, having pigment characteristics different from those of the transparent toner on the print paper. The portion (a) exhibits the light reflection at the portion subjected to printing with the toner having the pigment characteristics different from those of the transparent toner. The portion (b) exhibits the light reflection at the portion subjected to printing with the transparent toner on the portion subjected to printing with the toner having the pigment characteristics different from those of the transparent toner. Between the portions (a) and (b), there is the difference in reflectance.

This is because the transparent toner with high light reflectance is applied on the black toner that absorbs light, with pigment characteristics greatly different from those of the transparent toner, a dark pigment, and low light reflectance at the portion 204, unlike the portion 203.

There is a spot color recording material whose light reflectance changes at the portion subjected to printing after the print out. In printing using the spot color recording material having such characteristics, when a preview is performed prior to executing printing, the user cannot clearly check a print result only if a print region of the spot color recording material is displayed with a simple predetermined color.

As illustrated in the portions 201 to 204 in FIG. 2, the difference in reflectance in a print target portion between before and after printing with the transparent toner is hereinafter defined as a "gloss difference". The gloss difference occurs depending on a relationship between the transparent toner and the background state. The degree of the gloss difference varies depending on the difference from the background state.

According to the present exemplary embodiment, the gloss difference is quantitatively defined. Further, the gloss difference is defined as the difference in light reflectance between before and after printing with the transparent toner. The light reflectance is expressed as a percentage, and the gloss difference serving as the difference thereof is also consequently expressed as a percentage. The difference in reflectance is proportional to the amount of change in unevenness of the surface of output paper between before and after printing with the transparent toner.

Figure 7:
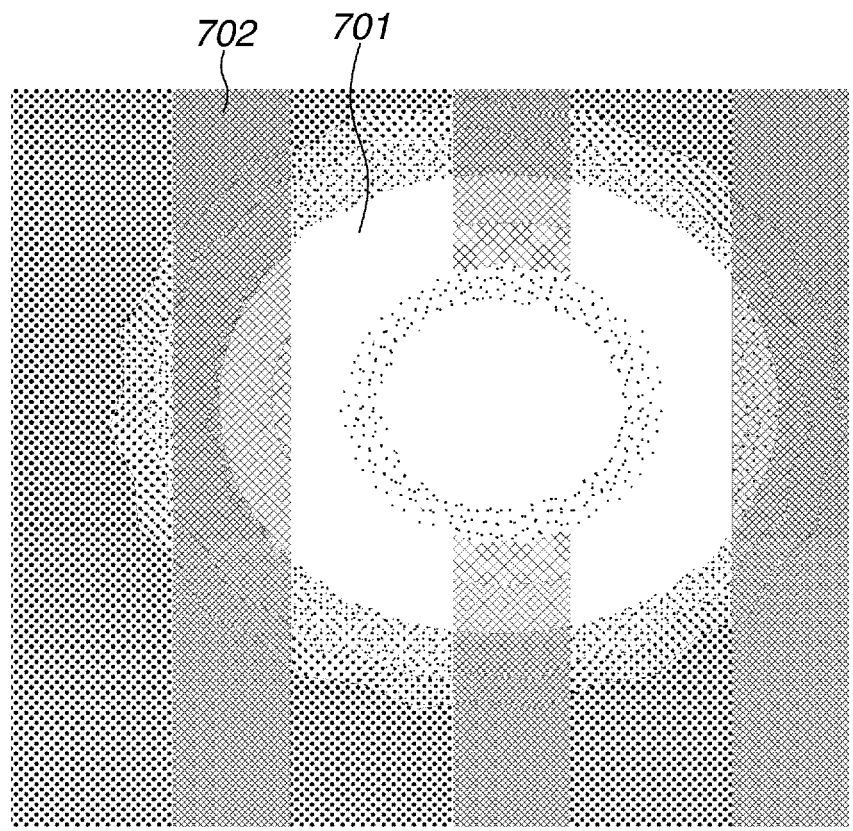
FIG. 7 illustrates an example of checking the gloss difference on the three-dimensional preview.

Advantageously, the gloss difference is obtained by using the transparent toner. Further, the gloss difference can be checked with the difference in reflection of a light source in the three-dimensional preview. FIG. 7 illustrates an example of the gloss difference when the transparent toner is applied to matted paper so that vertical stripes appear on the matted paper. In a region 701, printing is performed with the transparent toner, the light reflectance of the region is high, and the amount of reflection of a light source is large. On the other hand, in a region 702, printing is performed without the transparent toner, the light reflectance is lower than that in the region 701, and the amount of reflection of a light source is small.

Figure 3:
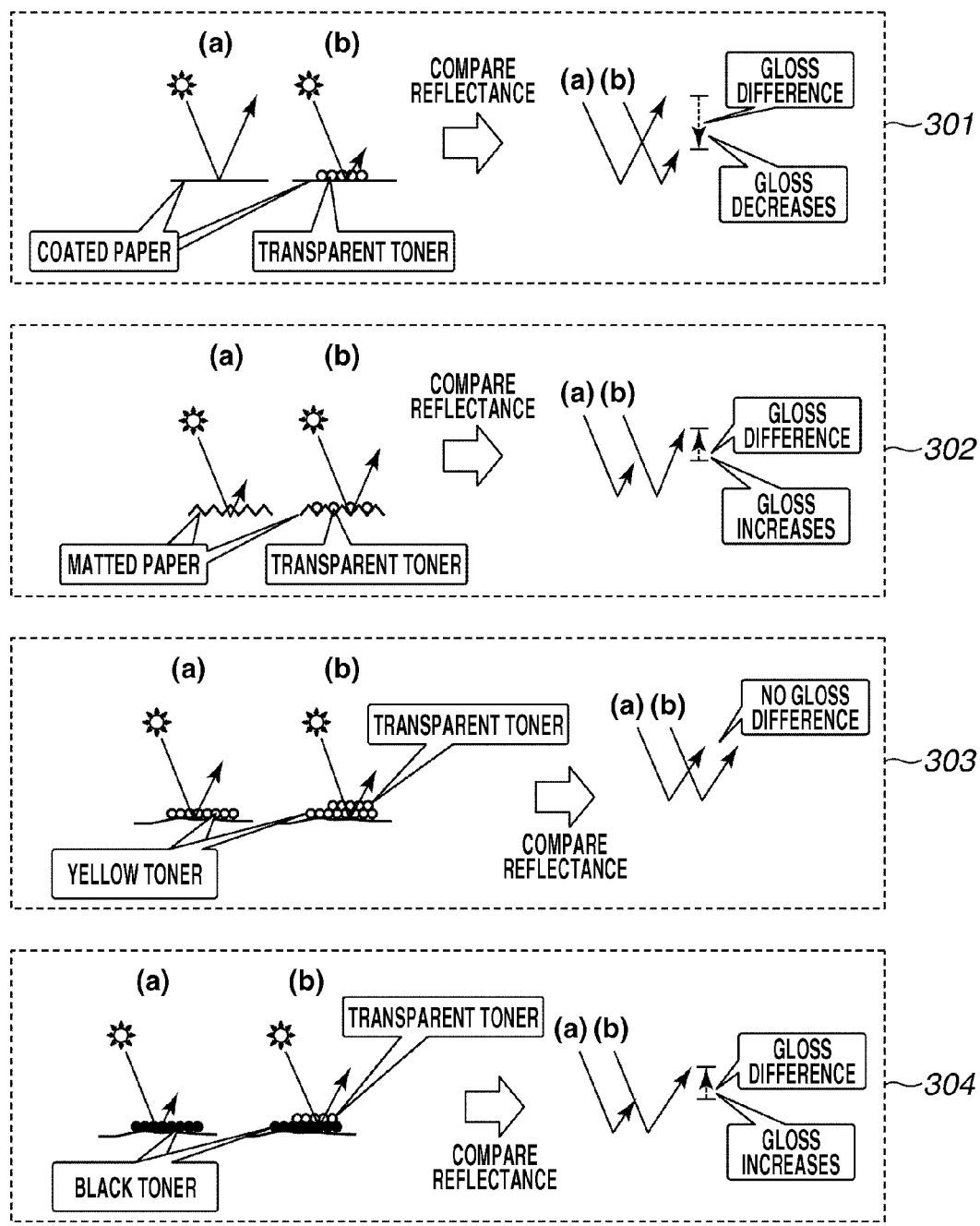
FIG. 3 illustrates examples of light reflectance.
Figure 4:
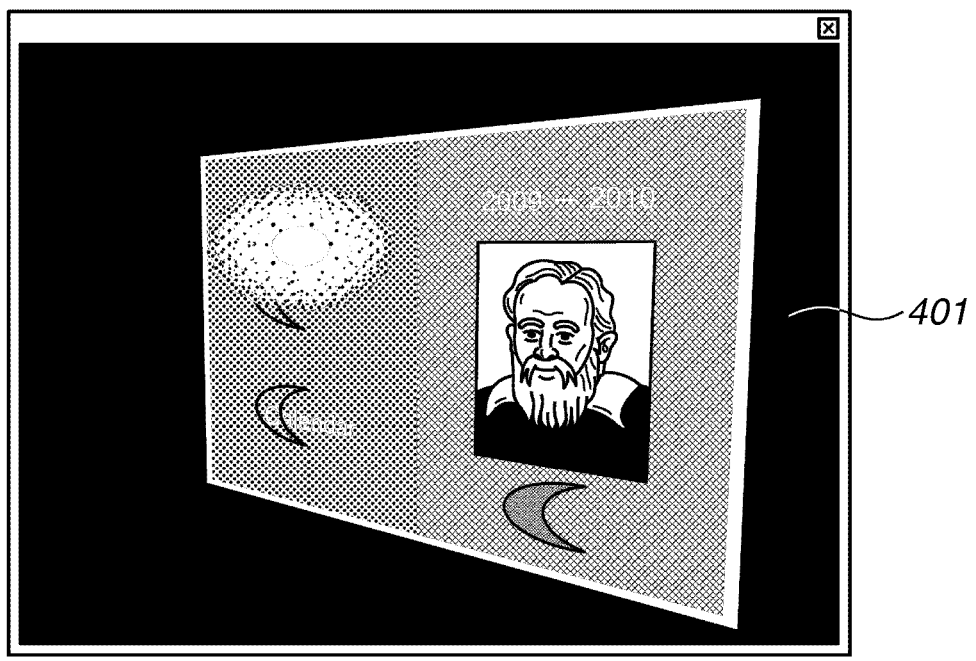
FIG. 4 illustrates an example of a three-dimensional preview.
Figure 5:
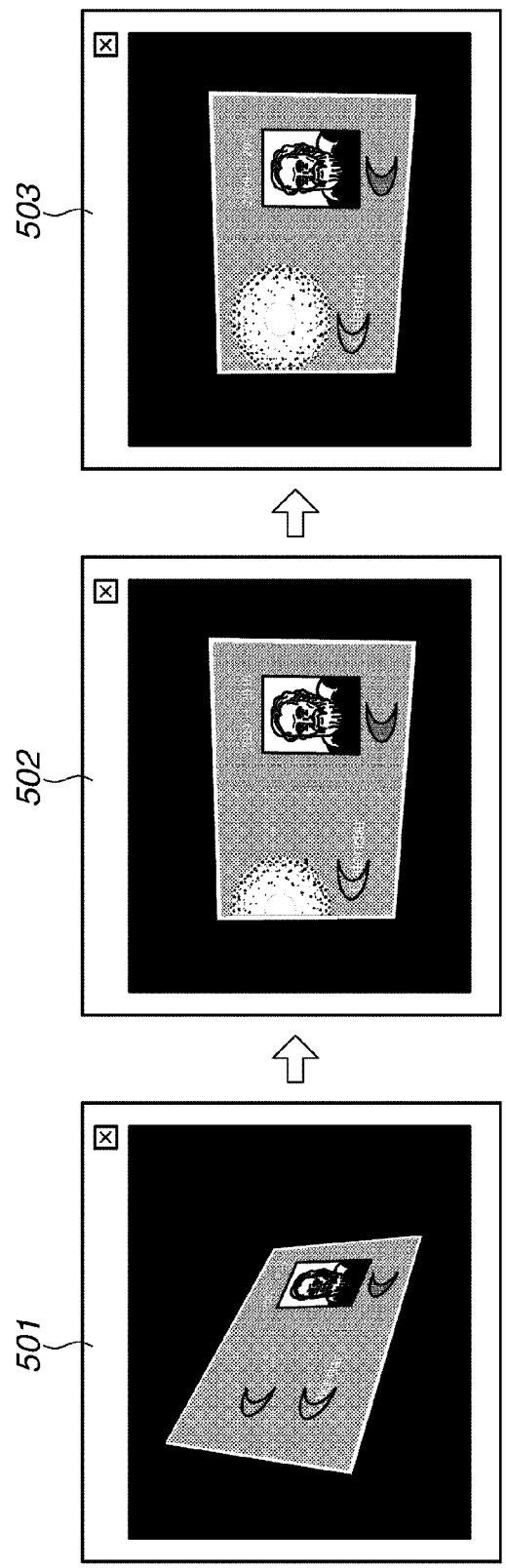
FIG. 5 illustrates an example of freely rotating the three-dimensional preview.
Figure 6:
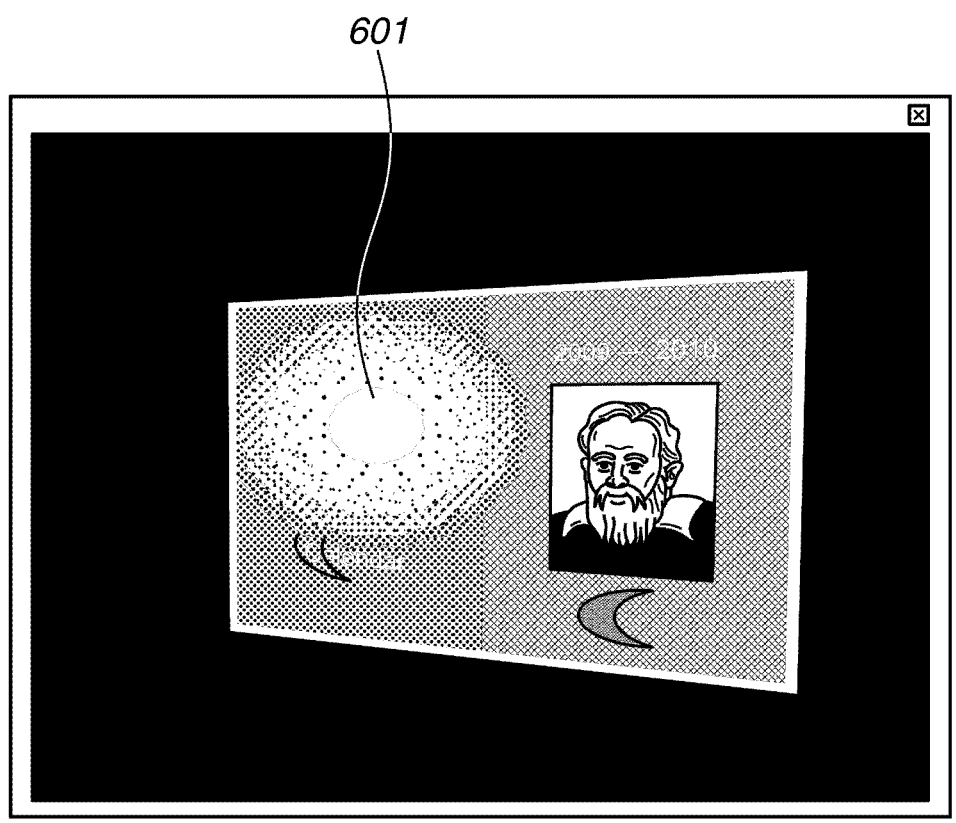
FIG. 6 illustrates an example of the three-dimensional preview.

FIG. 3 schematically illustrates the gloss difference in each of the portions 201 to 204 in FIG. 2. In a portion 301, printing (b) is performed with the transparent toner, and the reflectance of printing (b) is lower than that of printing (a) without the transparent toner ((a)>(b)). This state is expressed as "the gloss decreases". In portions 302 and 304, with printing (b) performed with the transparent toner, the reflectance of printing (b) is higher than that of printing (a) without the transparent toner ((a)<(b)). This state is expressed as "the gloss increases". In a portion 303, in both printing (b) and printing (a) with and without the transparent toner, the reflectance does not change ((a)=(b)). This state is expressed as "no gloss difference".

According to exemplary embodiments, an image processing apparatus is capable of printing with a spot color recording material and capable of providing a preview function of an image to be printed with the spot color recording material. However, as illustrated in the portions 201 to 204 in FIG. 2, the following processing is executed on a preview including the spot color recording material whose effect of the print finishing varies depending on the state of the background.

A series of the processing is briefly described.

Figure 8:
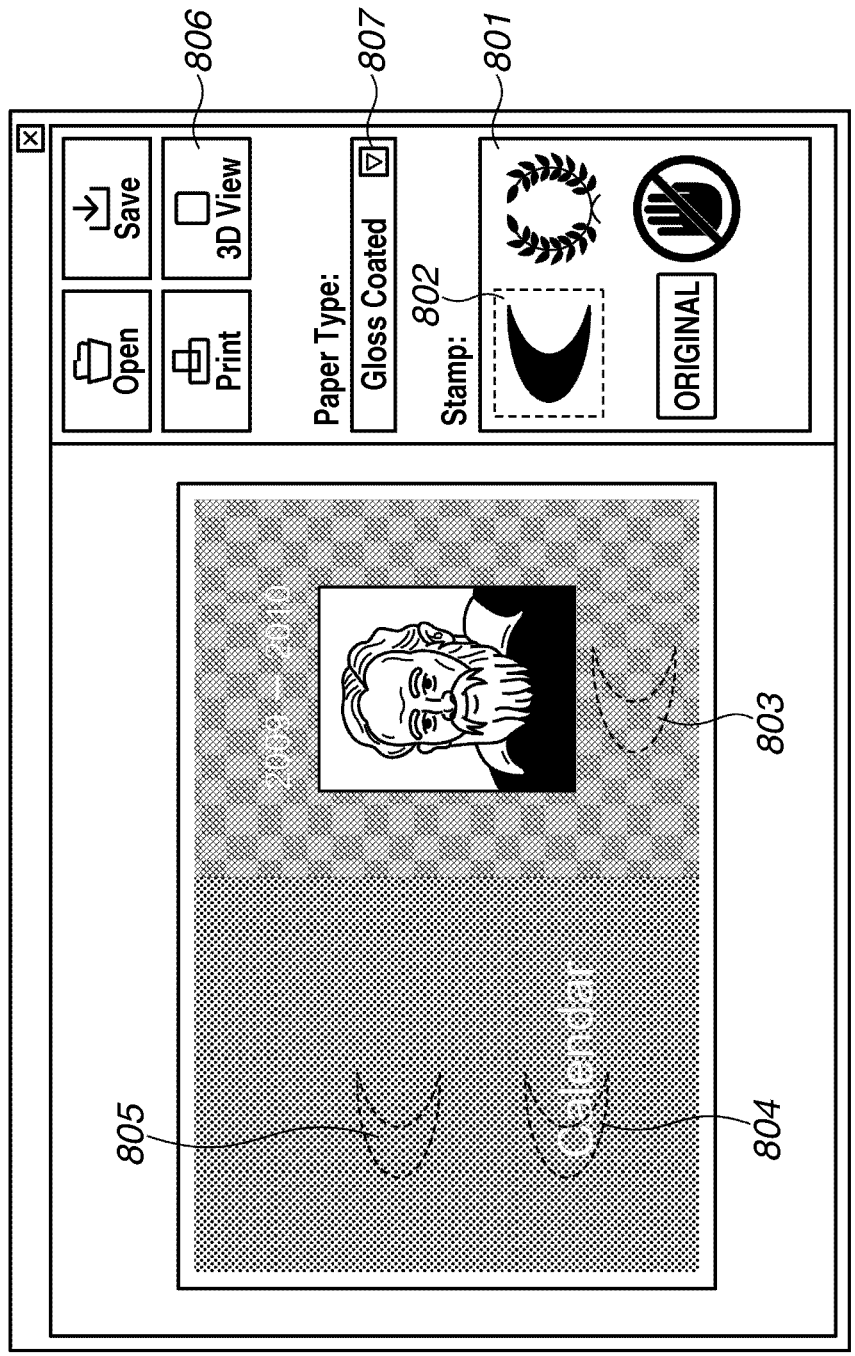
FIG. 8 illustrates an example of a user interface of an editing application for setting application of a spot color recording material.

First of all, it is required to designate a region for printing with the spot color recording material on the printed product prior to performing the three-dimensional preview. According to the present exemplary embodiment, with regard to a method for designating a portion to which the spot color recording material is applied on a page, an editing application as illustrated in FIG. 8 is available. As illustrated in a field 801, there are objects of annotation-format stamp. With a drag and drop operation as a general mouse operation, by inserting a user's desired stamp object into a screen as an editing target, a region can be designated for printing with the spot color recording material on the page. As an example, by dragging a stamp 802 and further dropping the stamp 802 to an arbitrary position 803, 804, or 805, the region is designated for printing partially with the spot color recording material on the page. In a field 807, a paper type that influences the reflectance of a light source can be selected. Further, when the user presses a button for starting the three-dimensional preview in a field 806, the three-dimensional preview starts.

A look-up table (LUT) that stores data on the light reflectance is used to calculate the reflectance of a light source, so that the reflection of a light source on the image can be previewed in the virtual space.

The "look-up table (LUT) that stores data on the light reflectance" means an information table including data on the light reflectance that changes depending on various conditions (paper type, an angle of incidence of the light source, amounts of application of CMYK toners, and an amount of application of transparent toner).

The LUT can be generated based on measurement values on the actual measurement for measuring a printed color chart with an optical measurement unit, or can be generated based on logical measurement values obtained by a color material simulator. In storing the data on the light reflectance in the LUT, the data on the light reflectance, e.g., a bidirectional reflectance distribution function is converted into data in a format used by a general optical model, and only a parameter of the optical model function is stored in the LUT. The color material simulator measures data on a computer, in place of the actual measurement. For the measurement, the color material simulator first receives a characteristic (indicating the unevenness) of the paper type or characteristics (refractive index or reflection characteristics (spectrum) of wavelengths) for colors. Thus, the color material simulator automatically calculates light reflection characteristics (i.e., the LUT) for combinations of amounts (0, 0, 0, 0) of application of CMYK toners→(50%, 50%, 50%, 50%)→(100%, 100%, 100%, 100%) for one paper type.

In converting the result of the actual measurement by the optical measurement unit into the optical model, in general, the approximation is performed with least square and a parameter of the target-model function is determined.

There are a large number of models for light reflection, including a simple model such as Fresnel reflection. According to the exemplary embodiment, any model may be used to obtain the light reflectance required for calculating the gloss difference.

According to the present exemplary embodiment, the reflection of a light source is defined as a state in which the light reflectance is 90% or more (the threshold is changeable).

FIG. 9 schematically illustrates a simple LUT. The LUT has parameters of a target-model function for combinations of the conditions as illustrated in columns 901 to 908. The actual LUT is a file having the conditions and the parameters capable of being read only by the image processing apparatus.

In the image processing apparatus capable of using the LUT, the following data is required as a necessary condition for obtaining the light reflectance. Specifically, the data includes a paper type 901, an angle 902 of incidence of the light source, an amount 903 of applied cyan toner, an amount 904 of applied magenta toner, an amount 905 of applied yellow toner, an amount 906 of applied black toner, and an amount 907 of applied transparent toner.

Therefore, processing is performed on the assumption that the LUT that stores parameters 908 of the target-model function for the combination of conditions is stored in the image processing apparatus or a memory connected to the image processing apparatus via a network.

Figure 10:
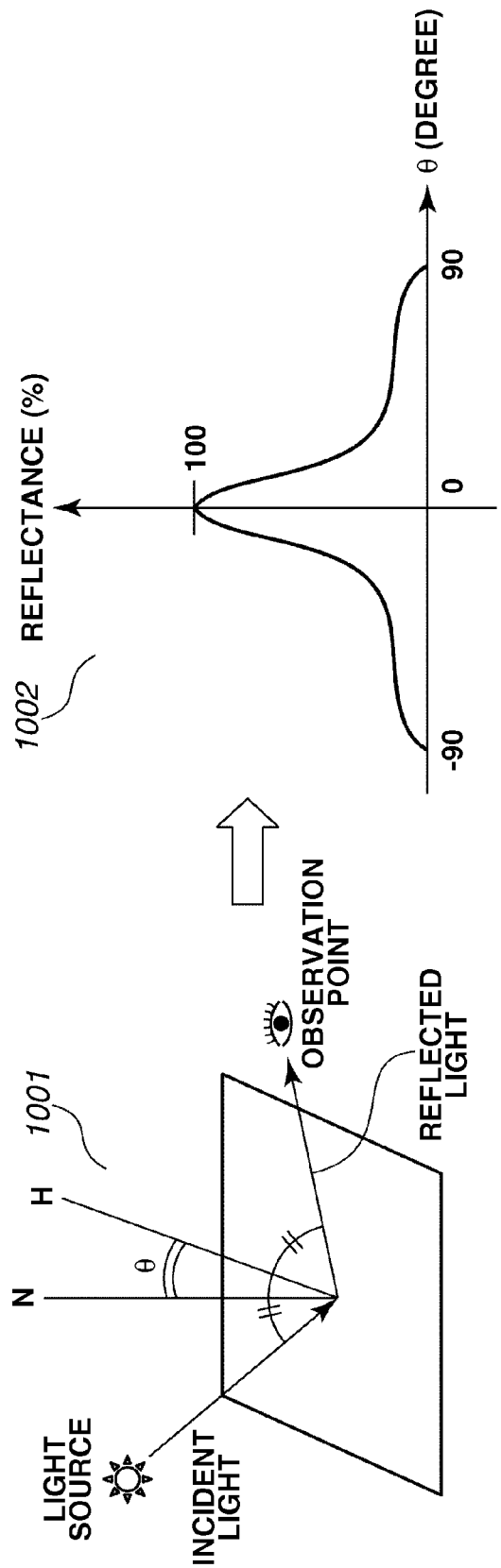
FIG. 10 schematically illustrates light reflection.

From the LUT according to the present exemplary embodiment, the parameter of the target-model function is obtained by inputting the conditions. Further, the parameter is substituted to the model function, and the reflectance is obtained corresponding to the state of the background. Although depending on the optical model, simply with a relation illustrated in FIG. 10, a light reflection phenomenon is established. A schematic diagram 1001 illustrating the light reflection includes a surface normal N, a bisector H of an angle formed by the incident direction of the light source and the observation direction of an observer, and an angle θ formed by the surface normal N and the bisector H. A relation between the reflectance of the light source and the angle θ is consequently illustrated as a graph 1002. The consequence changes depending on the parameters of the target-model function obtained from the conditions.

A description is given with the above-defined LUT and the optical model used according to the exemplary embodiment.

Figure 11:
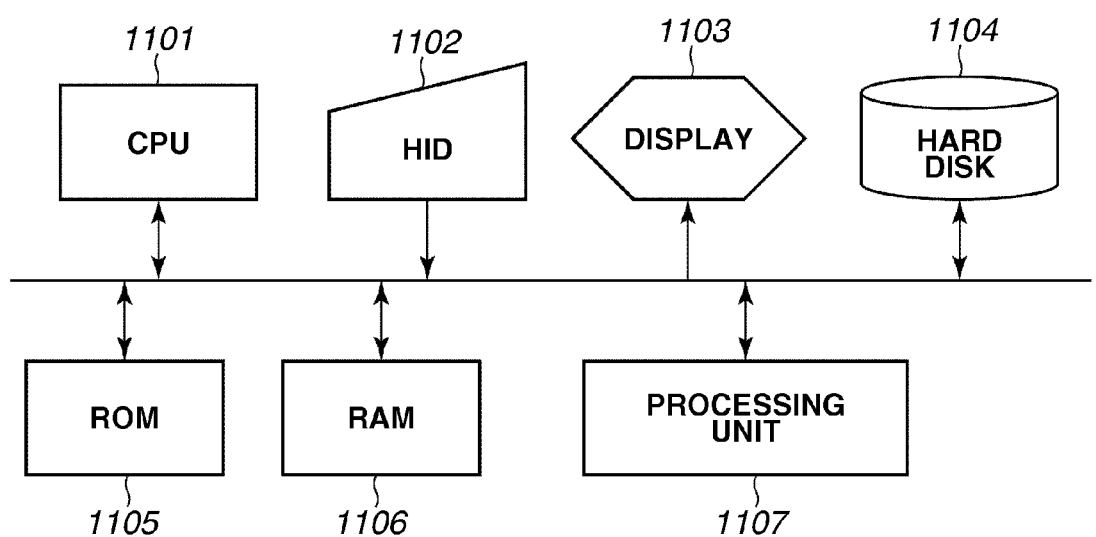
FIG. 11 is a block diagram of an example of a hardware configuration of an image processing apparatus according to an exemplary embodiment of the present invention.

FIG. 11 illustrates a block diagram of a configuration example of the image processing apparatus according to the exemplary embodiment of the present invention. A central processing unit (CPU) 1101 is used for controlling arithmetic operation. A human interface device (HID) 1102 for input of data and an instruction is a keyboard, a mouse, or a touch panel. A display 1103 displays an image. A hard disk 1104 stores data. A read-only memory (ROM) 1105 stores in advance a program for controlling the apparatus or necessary information. A random access memory (RAM) 1106 is used as various work areas. A processing unit 1107 performs data processing according to the present exemplary embodiment.

The processing unit 1107 is realized by the CPU 1101 executing a computer program stored in the ROM 1105. Thus, the computer program enables a computer to function as the processing unit 1107 in the image processing apparatus. A computer-readable storage medium that stores the computer program is not limited to the ROM 1105 and may be the hard disk 1104.

Although the transparent toner is used as a spot color recording material, the spot color recording material may be not only the transparent toner but a toner or ink that changes the gloss on a medium such as print paper or a medium on which the toner is applied. For example, in addition to the transparent toner, another spot color recording materials such as a light toner or a transparent ink may be used.

Figure 12:
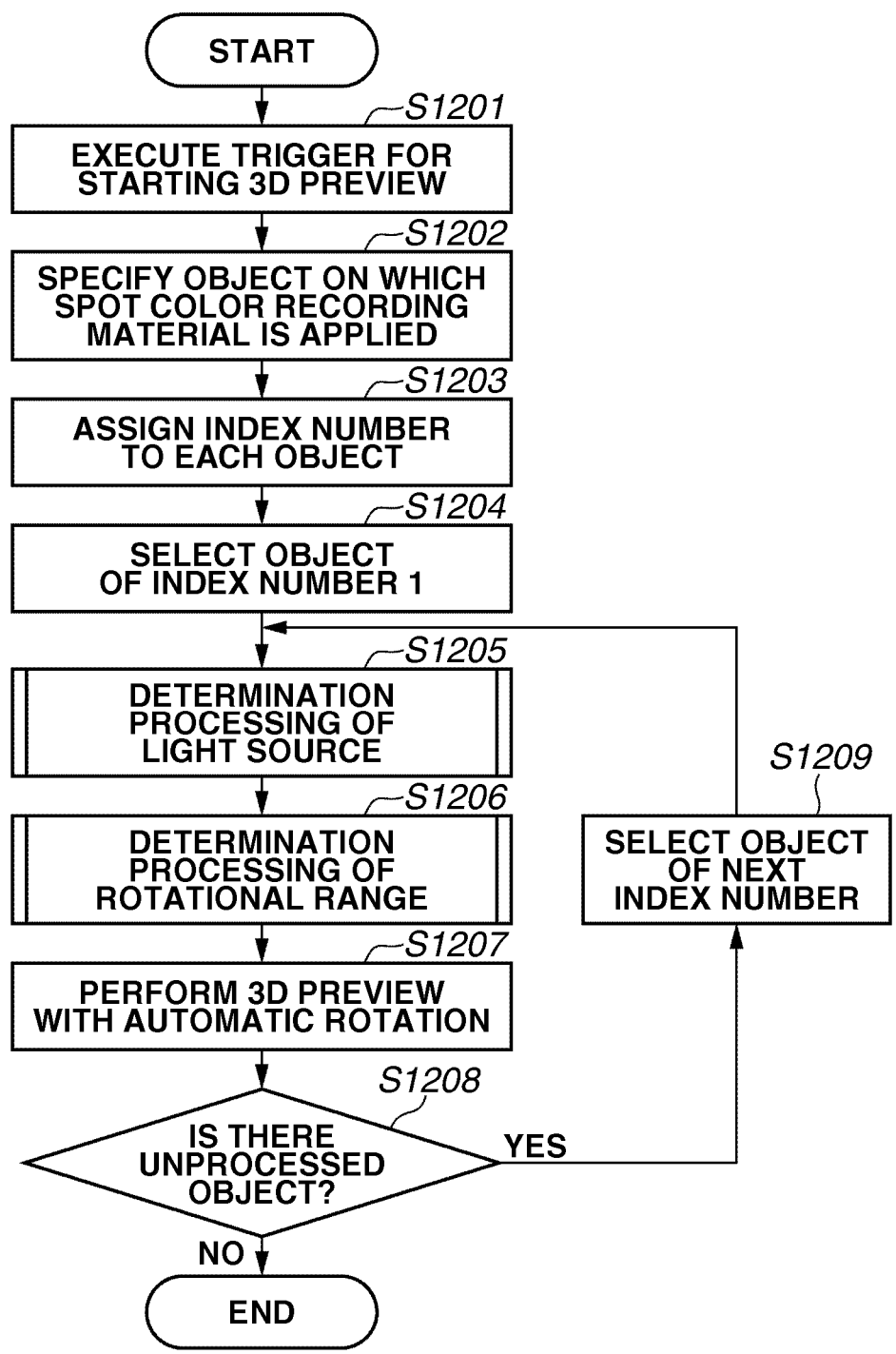
FIG. 12 is a flowchart of a processing sequence by the image processing apparatus according to the exemplary embodiment of the present invention.
Figure 13:
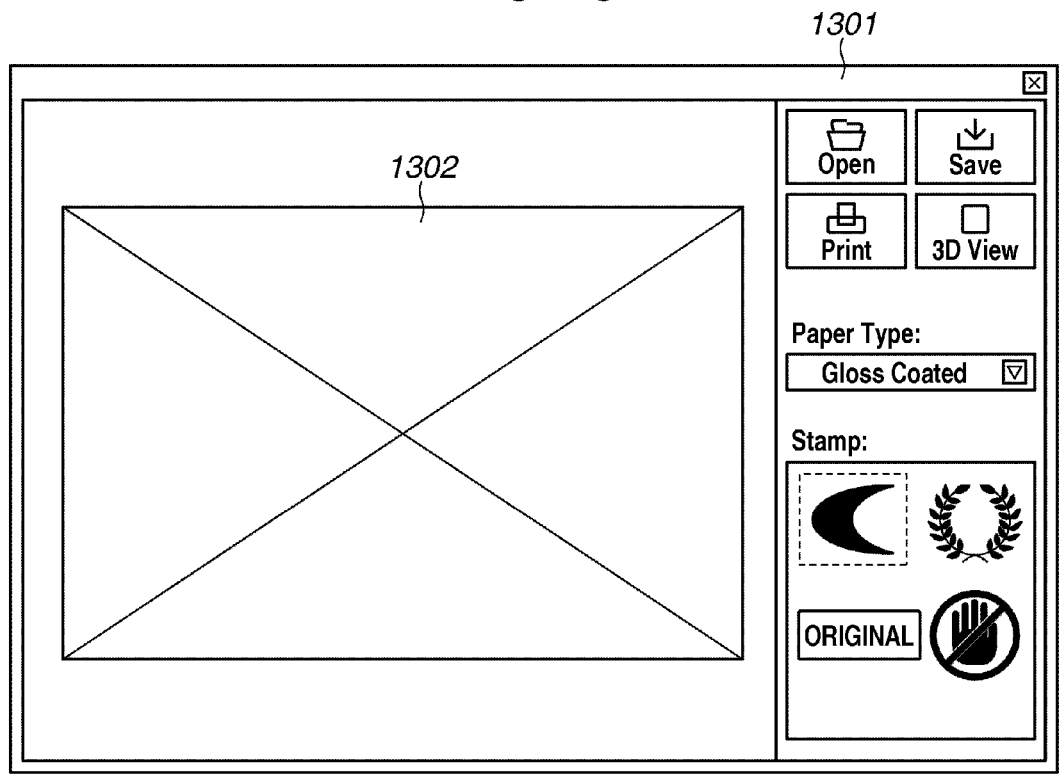
FIG. 13 illustrates an example of a user interface according to the exemplary embodiment of the present invention.

FIG. 12 is a flowchart of a processing sequence by the image processing apparatus according to the present exemplary embodiment. A user of the image processing apparatus executes the processing by operating the HID 1102 while checking the display 1103. The image processing apparatus includes a window and an interface as illustrated in a screen 1301 in FIG. 13, and starts processing by fetching drawable electronic document data such as a portable document format (PDF) and then displaying the drawable electronic document data in a region 1302. The image processing apparatus fetches not only the PDF data but also any drawable electronic document data, similar thereto. The drawable electronic document data is converted into drawing data of CMYK as process colors. Thus, the sizes of CMYK channels are converted into the amounts of application of CMYK toners to used as parameters for calculating the light reflectance.

Figure 14:
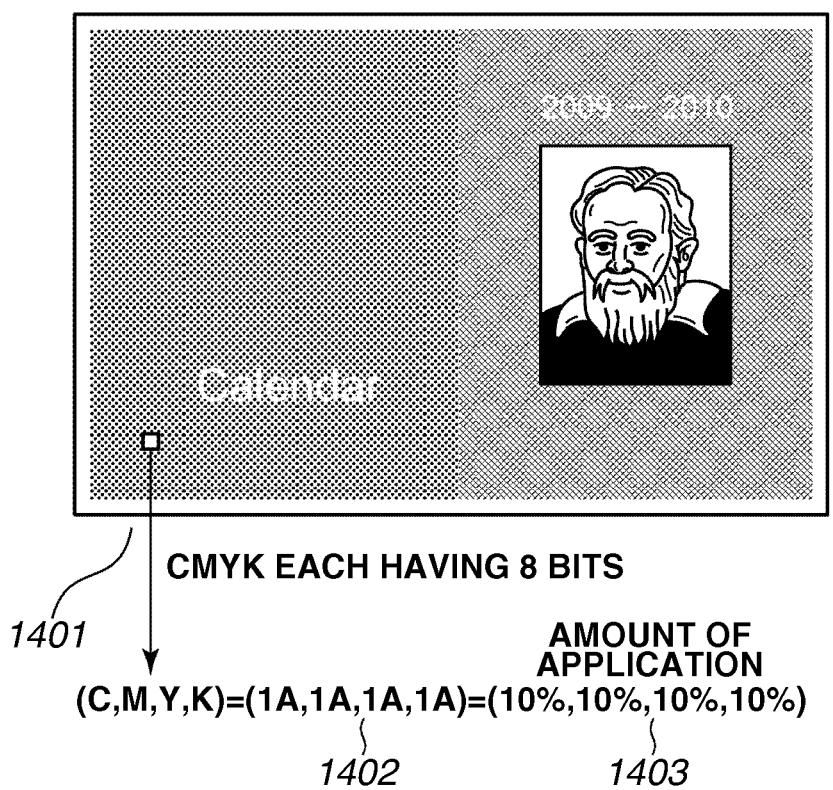
FIG. 14 illustrates an example of converting sizes of CMYK channels into amounts of application of CMYK toners with respect to a specific pixel.

FIG. 14 illustrates an example of converting the sizes of CMYK channels into the amounts of application of CMYK toners with respect to of a specific pixel. A pixel 1401 is extracted from drawing data of CMYK each having 8 bits, and the sizes 1402 of CMYK channels are obtained with respect to the pixel 1401. With the drawing data of CMYK toners each having 8 bits, the amounts of application of CMYK toners with respect to the pixel 1401, that is, the amounts 1403 of application of CMYK toners are obtained from the sizes 1402 of CMYK channels.

In step S1201, the three-dimensional preview starts to be generated at timing for pressing the field 806 as the button in FIG. 8 according to the present exemplary embodiment. In step S1202, the CPU 1101 specifies the position on the page, such as a position 803, 804, or 805 in FIG. 8, of the object to which printing is set with the spot color recording material.

In step S1203, the CPU 1101 assigns an index number to the object specified in step S1202. The index number is a serial number that is assigned in order (1, 2, 3, . . . ) of the objects set by the user on the editing application in FIG. 8. The objects processed in steps S1202 and S1203 are set as a table 2201 in FIG. 22 with information thereof.

In step S1204, the CPU 1101 selects the object of index number 1, and prepares a three-dimensional preview to that object.

Figure 15A:
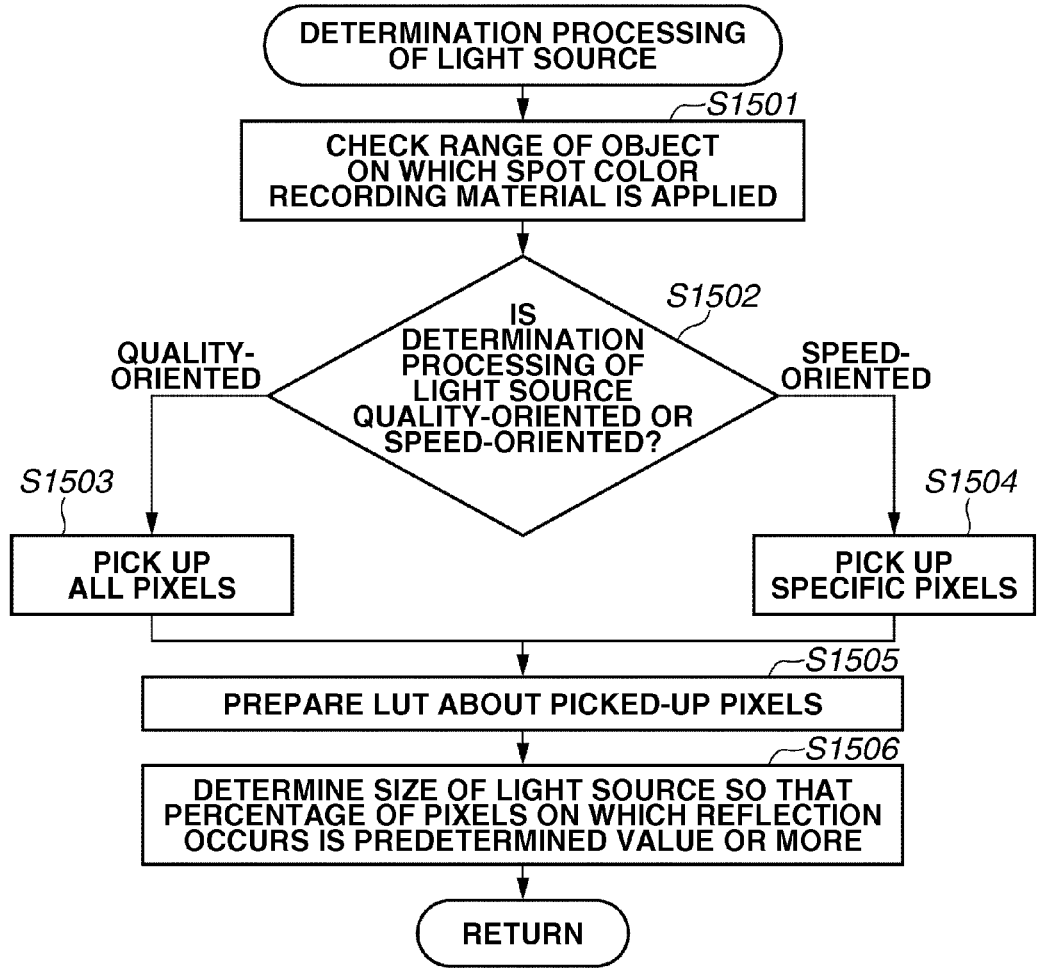
FIGS. 15A and 15B are respectively a flowchart of a processing sequence for determining a light source in the image processing apparatus and a complementary diagram thereof according to the exemplary embodiment of the present invention.

In step S1205, the CPU 1101 performs determination processing of the light source. The determination processing of the light source in step S1205 is described with reference to a flowchart in FIG. 15A.

In step S1501, the CPU 1101 checks a range of the object on which the spot color recording material is applied, selected in step S1204. In the case of the object of index number 1, the range of the object is rectangular to contain the object, as illustrated by a row 2205 for an object 2202 in FIG. 22.

Figure 23:
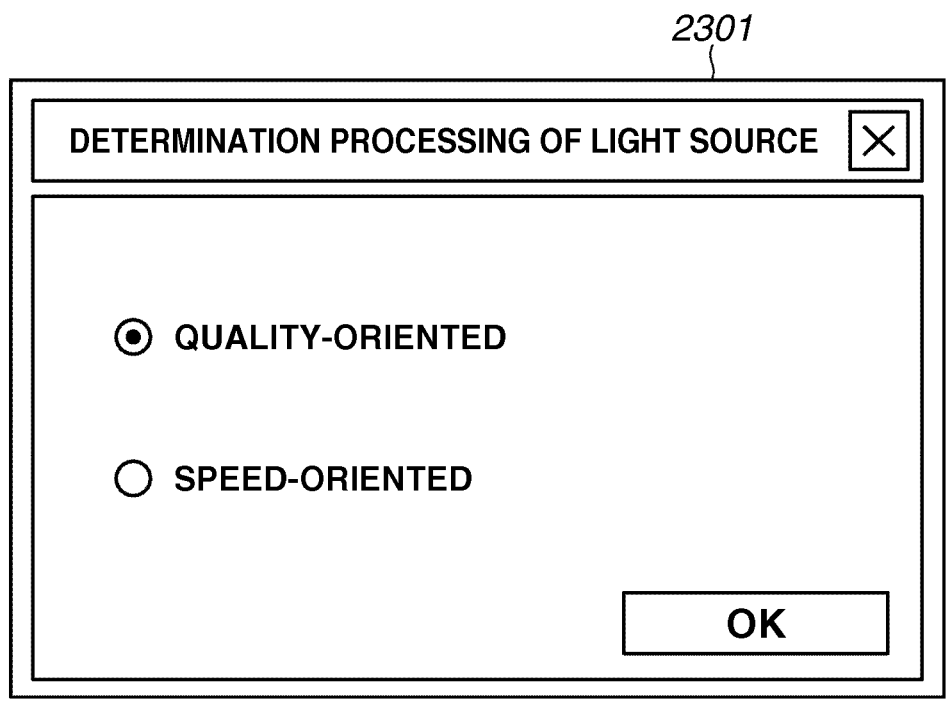
FIG. 23 illustrates an example of a setting dialog of determination processing of a light source.

In step S1502, the CPU 1101 determines whether the determination processing of the light source in the image processing apparatus is quality-oriented or speed-oriented. It is set in advance by the user with a setting dialog 2301 in FIG. 23 whether the determination processing of the light source in the image processing apparatus is quality-oriented or speed-oriented.

Figure 15B:
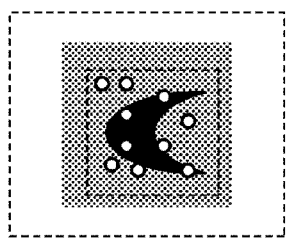

When the CPU 1101 determines that the determination processing is quality-oriented in step S1502, then in step S1503, the CPU 1101 picks up all pixels in the rectangular range checked in step S1501. When the CPU 1101 determines that the determination processing is speed-oriented in step S1502, then in step S1504, the CPU 1101 picks up specific pixels. As a pick-up method of the specific pixels, a position may be determined within the rectangular range by using random numbers to sample the specific pixels at random as illustrated in FIG. 15B.

In step S1505, the CPU 1101 obtains the LUT about the pixels picked up in step S1503 or S1504. Thus, the image processing apparatus refers to the parameters of the target optical model from the LUT, and then substitutes the parameters to the optical model function to calculate the reflectance of each pixel. According to the present exemplary embodiment, the position of the virtual light source may be the center of the object as an assumption when obtaining the reflectance, and the height may be fixed to give a size in width of a page as a preset value. Alternatively, the position of the virtual light source may be arbitrarily set or may be individually designated.

Figure 16:
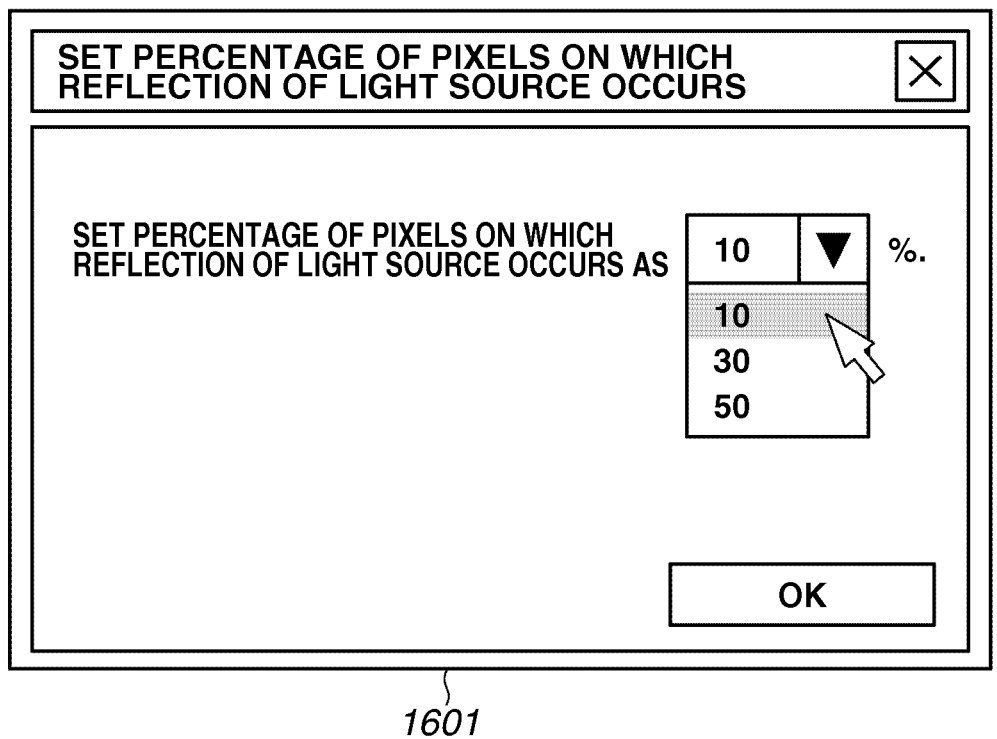
FIG. 16 illustrates an example of a setting dialog for setting a percentage of pixels on which the reflection of a light source occurs.

In step S1506, the CPU 1101 determines the characteristics (the size) of the light source so that the percentage of pixels on which the reflection of a light source occurs is a predetermined value or more among the pixels sampled in step S1503 or S1504. It is assumed that the user sets the percentage of pixels on which the reflection of a light source occurs with a setting dialog 1601 in FIG. 16 included in the image processing apparatus before step S1201, according to the present exemplary embodiment.

The display screen may display a thumbnail image of a virtual printed product when the percentage of pixels on which the reflection of a light source occurs is a value set with the dialog.

According to the present exemplary embodiment, "the reflection of a light source" is defined as a state in which the reflectance of the virtual light source on the surface of the virtual printed product is 90% or more. The threshold can be arbitrarily determined. The reflection of a light source means that information on the color of the light source is given to the surface of the virtual printed product according to the obtained reflectance. When the light source is white (RGB=255, 255, 255), in a state in which the reflectance at a pixel is 100%, even if the recording material printed on the surface of the virtual printed product is any color, the pixel is displayed as white (RGB=255, 255, 255).

When the light source is white (255, 255, 255) and the pixel of the surface of the virtual printed product is black (0, 0, 0), in a state in which the reflectance 50% is then given to the pixel, the pixel is displayed as an intermediate color (128, 128, 128).

When the surface of the virtual printed product is illuminated with the light source, the luminance increases and the color information on the surface of the virtual printed product is lost. Further, the color of the surface changes depending on the color of the used light source. When a light source with strong yellow tinge is used, the color of the surface of the virtual printed product has yellow tinge stronger than that of the light source as white. The LUT may be changed depending on the color of the used virtual light source.

With the following expression, a display color of an original image may be obtained when light is emitted from the virtual light source.

Display Color=Color of Original Image+(Color of Light Source−Color of Original image)×Reflectance FIG. 17 schematically illustrates a phenomenon of the reflection of a light source. With an optical model and characteristics of a light source, when a reflectance illustrated with a curve 1701 is obtained, the reflection on the paper surface can occur in a region 1702. When the characteristics of the light source are adjusted by, e.g., enlarging the light source, the reflectance illustrated with a curve 1703 is obtained and the reflection in a region 1704 is wider than that in the region 1702 on the paper surface.

According to the present exemplary embodiment, since the light reflectance varies depending on the pixel, the normal distribution of the reflectance illustrated in FIG. 17 is not necessarily obtained. In step S1506, the reflectance is calculated from the LUT prepared in step S1505 about the picked-up pixels, the size of the light source is adjusted to set the regions with the reflection of the light source in all the picked-up pixels to have a predetermined percentage to the paper surface (printed product). As a method for adjusting the size of the light source, light sources with a plurality of sizes are prepared, the reflectance of the individual light source is calculated for each pixel, and the size of the light source is determined to have the closest value to the predetermined percentage.

When, in step S1506, the size of the light source is determined, the processing proceeds to step S1206. In step S1206, a rotational range for inclining the page is determined on the three-dimensional preview. A description is given of the determination processing of the rotational range in step S1206 with reference to a flowchart in FIG. 18A.

Figure 18B:
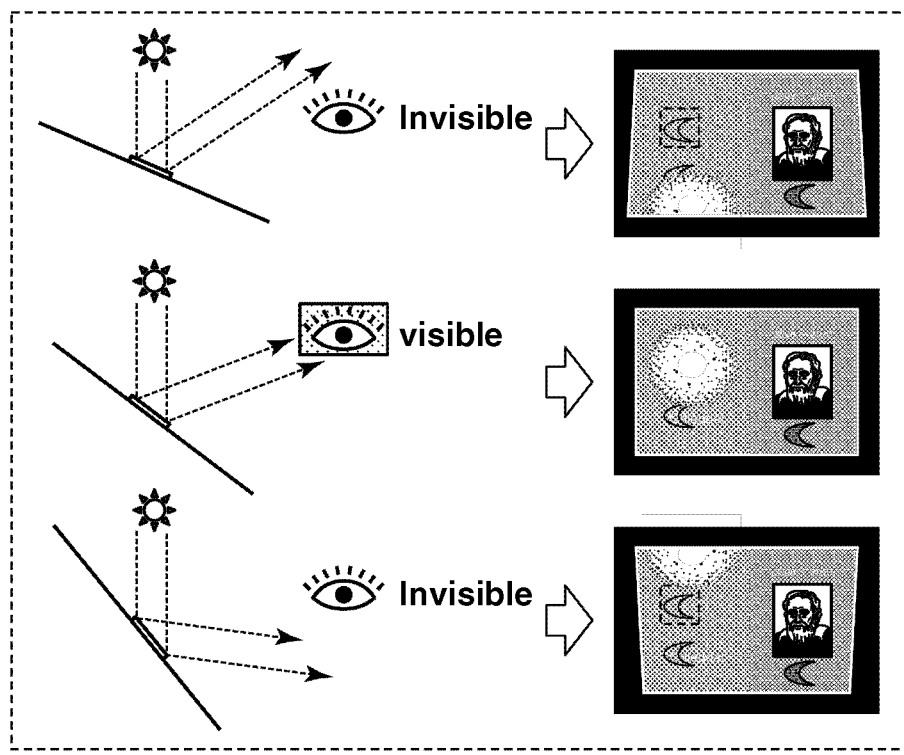

In step S1801, the CPU 1101 obtains a range of an angle $\phi 1$ with which the reflection of a light source occurs on the printed product with respect to a rotation around the vertical direction of the page. As the method thereof, as illustrated in FIG. 18B, a range is obtained so that the viewpoint enters a region with an angle with which the specular reflection of the light source occurs. This is similar to the manner for obtaining an angle with which a person is reflected on a flat mirror. When the range of the angle with which the reflection of a light source occurs is strictly obtained, as illustrated in FIG. 17, with an angle other than an angle ($\phi=0$) with which the specular reflection occurs, the reflection also occurs. Therefore, with such a method, the angular range is not obtained with high accuracy. When a preview target is automatically rotated in the three-dimensional preview, even if the angular range is slightly different, this does not greatly influence a preview result in appearance. Therefore, the priority is put on the speed rather than the strictness and, with a method for entrance of the viewpoint with the angle with which the specular reflection of a light source occurs, the range of the angle $\phi 1$ with which the reflection of a light source occurs is obtained.

Figure 18C:
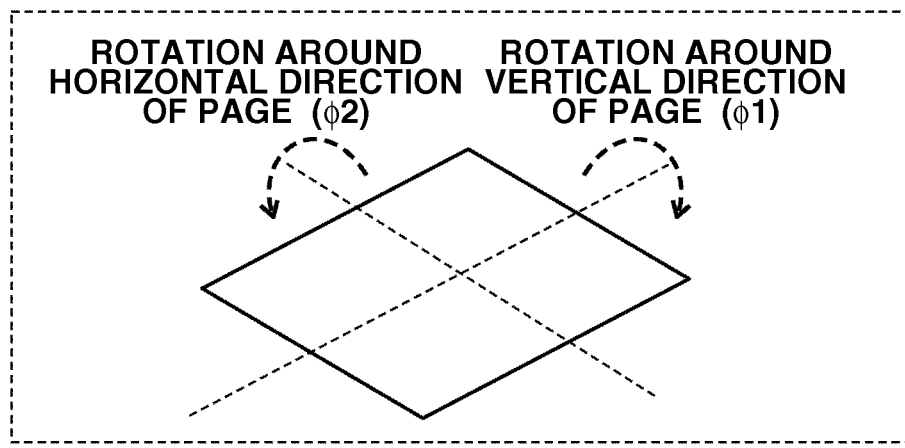

In step S1802, the CPU 1101 obtains a range of an angle $\phi 2$ with which the reflection of a light source occurs on the printed product with respect to a rotation around the horizontal direction of the page as illustrated in FIG. 18C with the same method as that in step S1801. Then, the CPU 1101 ends the determination processing of the rotational range. The processing proceeds to step S1207.

In step S1207, the CPU 1101 performs the three-dimensional preview with automatic rotation of the virtual printed product as a preview target in the virtual space by using the light source determined in step S1205 and the rotational range determined in step S1206.

Figure 19:
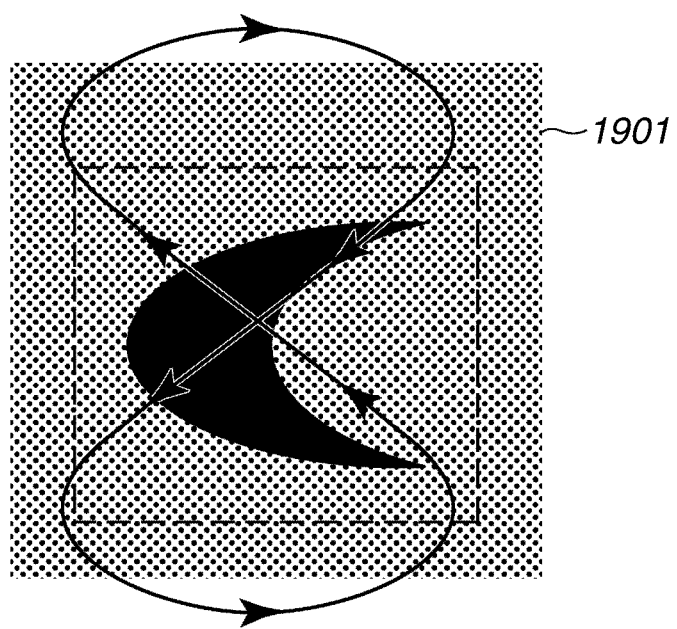
FIG. 19 illustrates an example of a locus of the reflection of a light source.

Depending on a using manner of the angles φ1 and φ2 obtained in step S1206, when a period for rotation with the angle φ1 is set as 2 sec and a period for rotation with the angle φ2 is 1 sec, as illustrated in FIG. 19, a locus 1901 of the reflection of the virtual light source is obtained at a period of 2 sec.

In step S1208, the CPU 1101 determines whether there is an unprocessed object. When there is an unprocessed object (YES in step S1208), then in step S1209, the CPU 1101 selects an object of the next index number, and the processing then returns to step S1205. When there is no unprocessed object (NO in step S1208), the CPU 1101 ends the processing according to the present exemplary embodiment. As a trigger for shifting step S1207 to step S1208, a predetermined key input is set on the HID 1102.

When the preview display desired by the user is not realized, the user may restore the editing screen in FIG. 8 to designate again a position or an effect for applying the spot color recording material.

According to the present exemplary embodiment, the user can designate the percentage for reflecting the virtual light source on the virtual printed product. Therefore, the texture of the spot color recording material can be checked at the desired percentage of pixels on which the reflection of a light source occurs. Further, the user can check, without troublesomeness, an operation for checking the texture by freely rotating the virtual printed product on the three-dimensional preview via a mouse and emitting light of the virtual light source to a region for printing with the spot color recording material.

After the virtual printed product is automatically rotated within the determined rotational range, the user may freely control the virtual printed product for rotation via a mouse independently of the rotational range. Thus, the user views the rotational range for the easiest view of the virtual printed product as demonstration, and can thereafter preview the virtual printed product at a user's desired angle.

Figure 20:
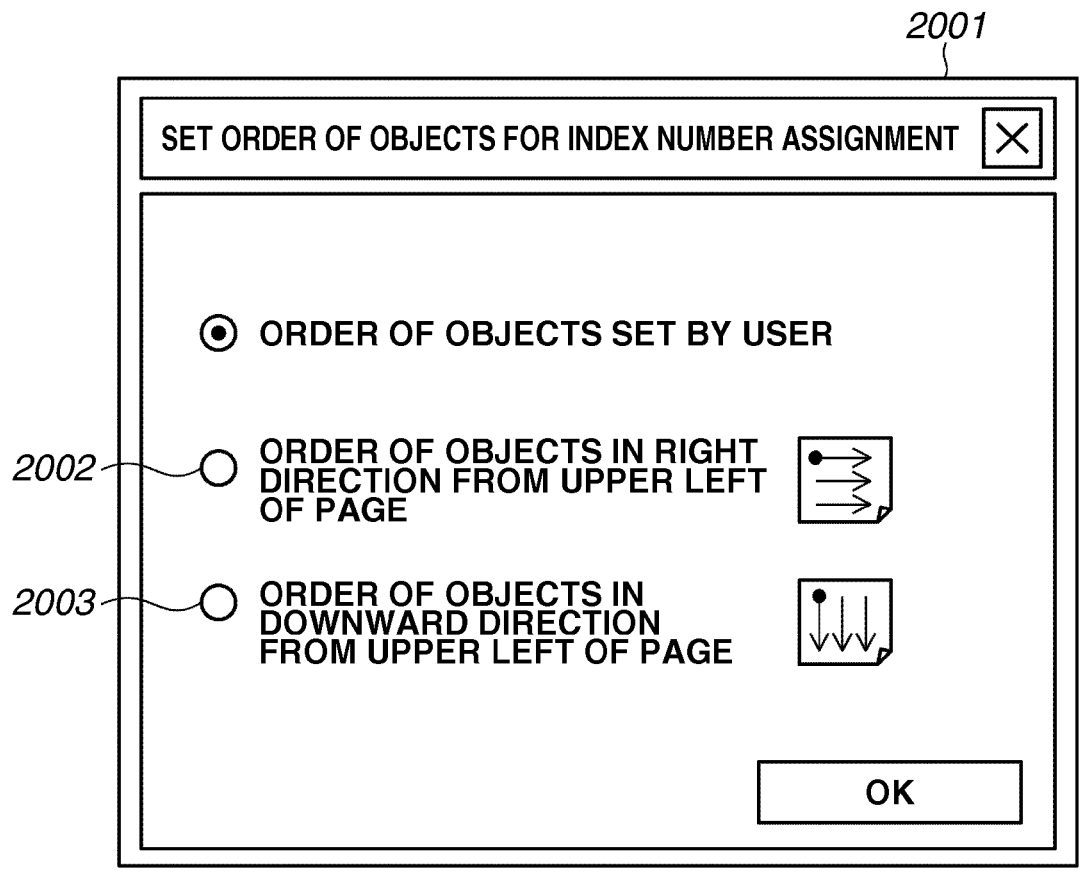
FIG. 20 illustrates an example of a setting dialog for setting the order of reflection of a light source.

According to the above-described exemplary embodiment, in step S1203, the index number is assigned to the object on the editing application in FIG. 8 in the order (1, 2, 3, . . . ) of the objects set by the user. However, the order is not limited to this. Therefore, with a setting dialog 2001 in FIG. 20, the user may select the order (of objects for index number assignment) of the objects, on which the spot color recording material is applied, for the reflection of a light source. As an option 2002 or 2003, the order of objects for index number assignment may be set according to the arrangement positions on the page.

Figure 22:
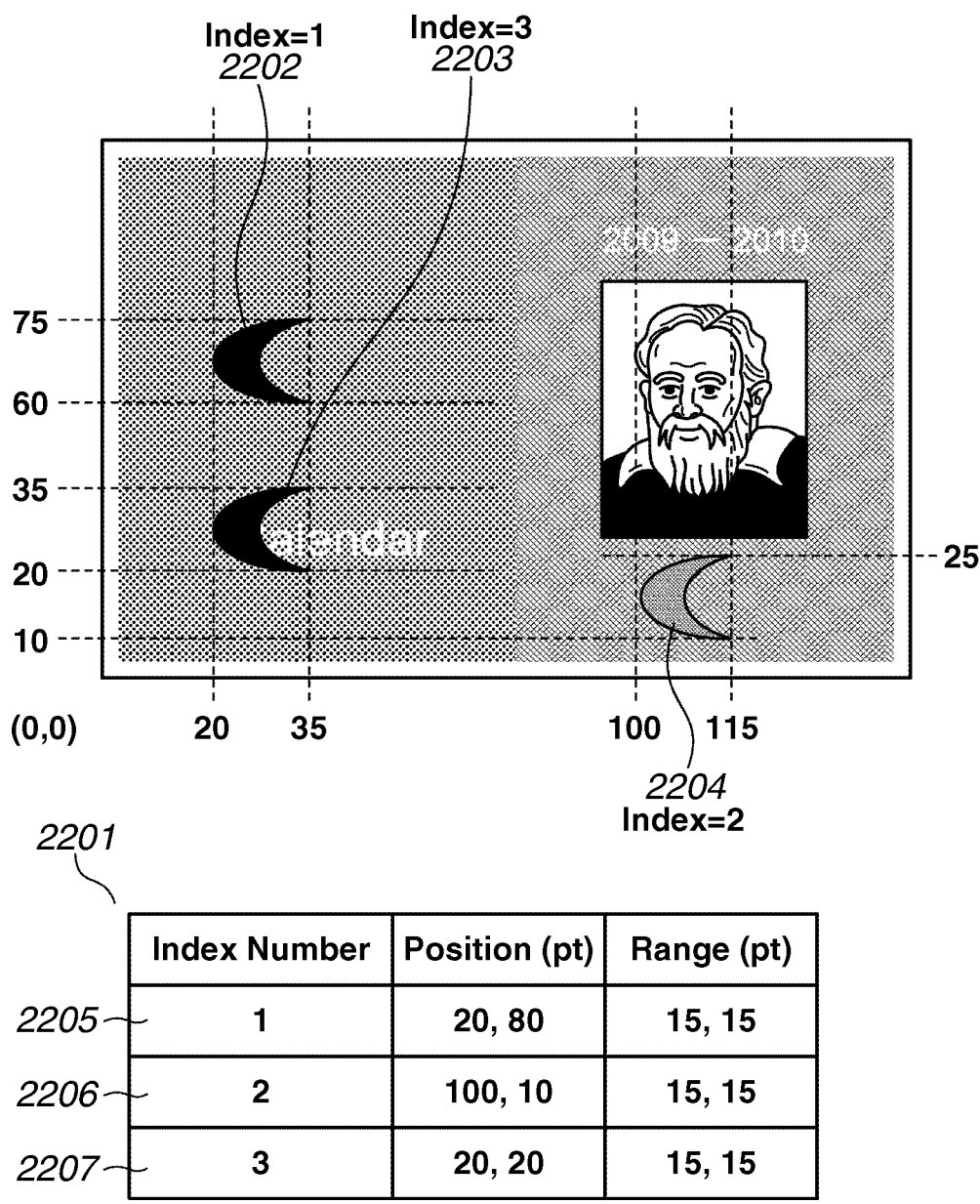
FIG. 22 illustrates an example of a table of information on objects.
Figure 24:
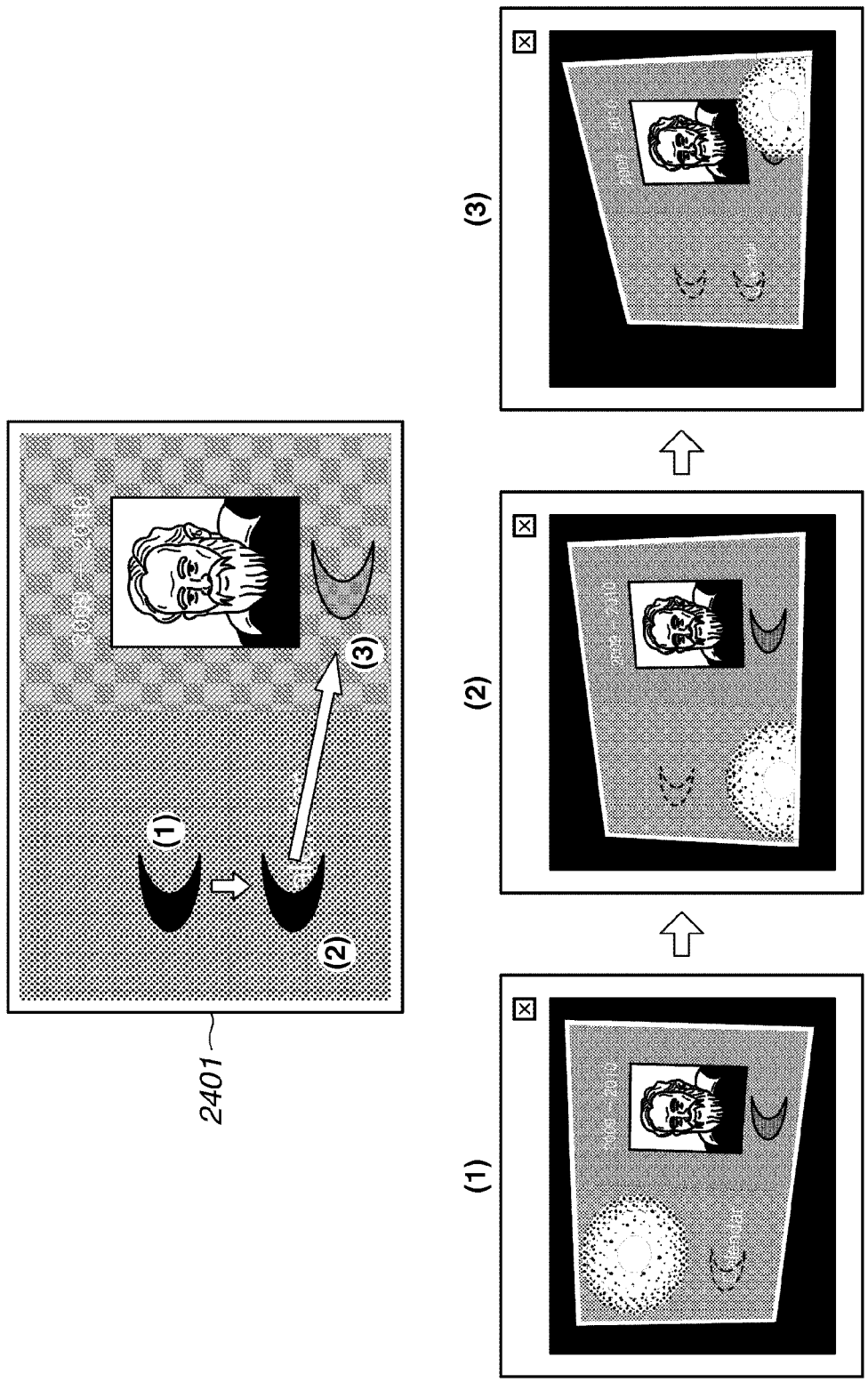
FIG. 24 illustrates an example of transition of the reflection of a light source.

Conventionally, the index number in FIG. 22 is assigned in the order of the objects set by the user. The index number 1 is assigned to the object 2202, the index number 2 is assigned to the object 2204, and the index number 3 is assigned to the object 2203. However, when the user selects the option 2002 with the setting dialog 2001, the index number 1 is assigned to the object 2202, the index number 2 is assigned to the object 2203, and the index number 3 is assigned to the object 2204, so that the reflection of a light source moves as illustrated on a screen 2401 in FIG. 24.

According to the present exemplary embodiment, the user can set the order of objects for automatic rotation on the three-dimensional preview according to the user's preference.

Figure 21:
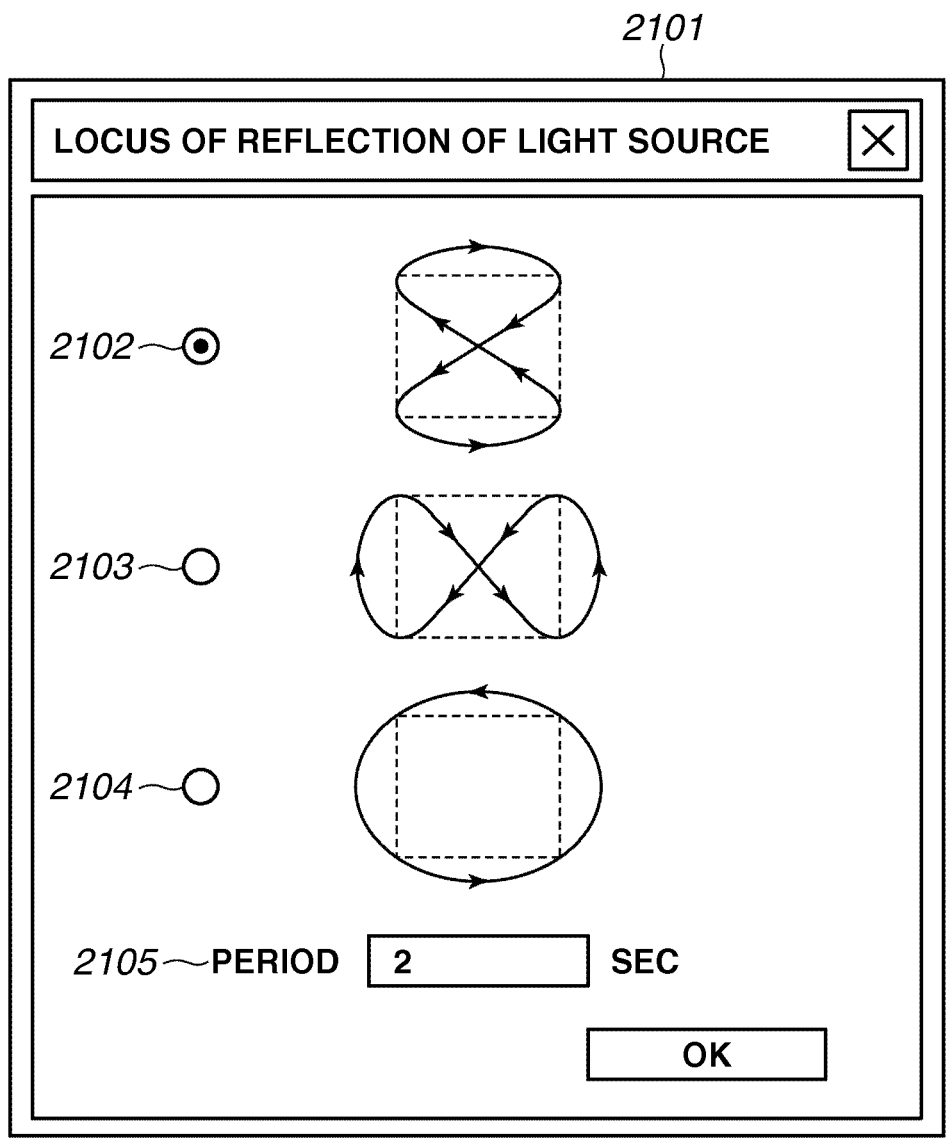
FIG. 21 illustrates an example of a setting dialog for setting locus shapes of the reflection of a light source.

According to the above-described exemplary embodiment, in step S1207, the locus and period of the reflection of a light source given by the automatic rotation can be selected with a setting dialog 2101 in FIG. 21. If the locus shape of the reflection of a light source for selection can be controlled by a trigonometric function as illustrated by options 2102, 2103, and 2104, the reflection of a light source can be smoothly automatically rotated. Therefore, the reflection of a light source can be used as an option of the locus shape. The period for drawing the locus of the reflection of a light source can be set via an entry box 2105 in FIG. 21.

According to the present exemplary embodiment, the locus shape and period of the reflection of a light source can beset on the three-dimensional preview according to the user's preference.

Aspects of the present invention can also be realized by a computer of a system or apparatus (or devices such as a CPU or MPU) that reads out and executes a program recorded on a memory device to perform the functions of the above-described embodiment (s), and by a method, the steps of which are performed by a computer of a system or apparatus by, for example, reading out and executing a program recorded on a memory device to perform the functions of the above-described embodiment (s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-192400 filed Aug. 30, 2010, which is hereby incorporated by reference herein in its entirety.

What is claimed is:

1. An image processing apparatus comprising:
   a designation unit configured to designate a region for printing on a virtual printed product with a transparent recording material;
   an acquisition unit configured to acquire a reflectance in the region for printing with the transparent recording material on the region designated by the designation unit;
   a setting unit configured to set a percentage of a region in which the reflectance obtained by the acquisition unit is larger than a threshold to the virtual printed product;
   a display unit configured to display a preview of the virtual printed product on which the region with the reflectance larger than the threshold exists at the percentage set by the setting unit; and
   an automatic rotation unit configured to, when rotating the virtual printed product to set a preview in which reflection of a light source occurs on the region designated by the designation unit, rotate the virtual printed product according to a shape of a locus of the reflection of a light source set by a user.

2. The image processing apparatus according to claim 1, wherein the display unit adjusts a size of a virtual light source so that the region with the reflectance larger than the threshold exists at the percentage set by the setting unit, and displays the preview using the adjusted virtual light source.

3. The image processing apparatus according to claim 1, wherein the display unit rotates and displays the virtual printed product within a range in which the region with the reflectance larger than the threshold exists at the percentage set by the setting unit.

4. The image processing apparatus according to claim 1, further comprising:
a first transition unit configured to, when there are a plurality of regions designated by the designation unit, move reflection of a light source on the region for printing with the transparent recording material in an order set by a user.

5. The image processing apparatus according to claim 4, further comprising:
a second transition unit configured to, when there are a plurality of regions designated by the designation unit on a page, move reflection of a virtual light source on the designated region in order of arrangement positions of the plurality of regions on the page.

6. The image processing apparatus according to claim 1, wherein the automatic rotation unit rotates the virtual printed product at a period set by the user when rotating the virtual printed product.

7. The image processing apparatus according to claim 1, wherein the acquisition unit generates a look-up table depending on a paper type used for printing out the virtual printed product, and refers to the generated look-up table to acquire the reflectance in the region for printing with the transparent recording material.

8. The image processing apparatus according to claim 1, wherein, when setting the percentage of the region in which the reflectance obtained by the acquisition unit is larger than the threshold to the virtual printed product, the setting unit displays a thumbnail image of the virtual printed product at the set percentage.

9. The image processing apparatus according to claim 1, wherein the transparent recording material is a transparent toner.

10. A method for controlling an image processing apparatus, the method comprising:
designating a region for printing on a virtual printed product with a transparent recording material;
acquiring a reflectance in the region for printing with the transparent recording material on the designated region;
setting a percentage of a region in which the acquired reflectance is larger than a threshold to the virtual printed product;
displaying a preview of the virtual printed product on which the region with the reflectance larger than the threshold exists at the set percentage; and
when rotating the virtual printed product to set a preview in which reflection of a light source occurs on the designated region, rotating the virtual printed product according to a shape of a locus of the reflection of a light source set by a user.

11. The method according to claim 10, further comprising:
adjusting a size of a virtual light source so that the region with the reflectance larger than the threshold exists at the set percentage, and displaying the preview by using the adjusted virtual light source.

12. The method according to claim 10, further comprising:
rotating and displaying the virtual printed product within a range in which the region with the reflectance larger than the threshold exists at the set percentage.

13. The method according to claim 10, further comprising:
when there are a plurality of the designated regions, moving reflection of a light source on the region for printing with the transparent recording material in an order set by a user.

14. The method according to claim 10, further comprising:
when there are a plurality of the designated regions on a page, moving reflection of a virtual light source on the designated region in order of arrangement positions of the regions on the page.

15. The method according to claim 10, further comprising:
rotating the virtual printed product at a period set by the user when rotating the virtual printed product.

16. The method according to claim 10, further comprising:
generating a look-up table depending on a paper type used for printing out the virtual printed product, and referring to the generated look-up table to acquire the reflectance in the region for printing with the transparent recording material.

17. The method according to claim 10, further comprising:
when setting the percentage of the region in which the acquired reflectance is larger than the threshold to the virtual printed product, displaying a thumbnail image of the virtual printed product at the set percentage.

18. The method according to claim 10, wherein the transparent recording material is a transparent toner.

19. A non-transitory computer-readable storage medium storing a program for causing a computer to execute the method according to claim 10.

* * * * *